Nov. 21, 1961 W. E. ARMSTEAD 3,009,663

MAGNETIC RECORDING AND/OR REPRODUCING MACHINES

Filed Oct. 1, 1957 3 Sheets-Sheet 1

Inventor
W. E. Armstead
By
Webb Mackey + Burden
Attorney

Nov. 21, 1961 W. E. ARMSTEAD 3,009,663

MAGNETIC RECORDING AND/OR REPRODUCING MACHINES

Filed Oct. 1, 1957 3 Sheets-Sheet 2

Inventor
W. E. Armstead
By
Webb Mackey & Burden
Attorney

MAGNETIC RECORDING AND/OR REPRODUCING MACHINES

Filed Oct. 1, 1957 3 Sheets-Sheet 3

Inventor
W. E. Armstead
By
Webb Mackey & Burden
Attorney 3,009,663
MAGNETIC RECORDING AND/OR REPRODUCING MACHINES Walter Edward Armstead, Staines, England, assignor to M.S.S. Recording Company Limited, Colnbrook, England, a British company Filed Oct. 1, 1957, Ser. No. 687,471
Claims priority, application Great Britain Oct. 5, 1956
11 Claims. (Cl. 242—55.12)

Figure 1:
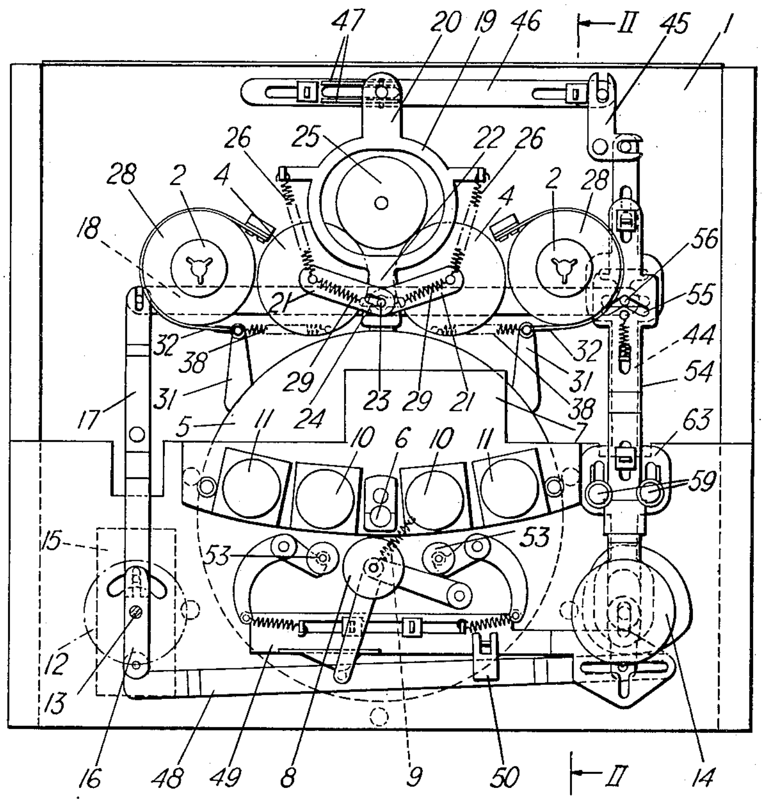

This invention relates to recording and/or reproducing machines using magnetic tape or wire as the carrier of the record. The invention is concerned with a mechanism for driving the carrier at constant speed in one direction or for driving the carrier at constant speed in the reverse direction, as desired. The invention is applicable to machines for recording and/or reproducing either single track records or certain multi-track records where the tracks are disposed side by side along the length of a tape, the tracks being adapted to be played at the same time, or one after the other.

A mechanism of the kind to which the invention relates (hereinafter referred to as a mechanism of the type described) comprises two rotary reel supports for receiving reels or other holders for the carrier (hereinafter for convenience referred to as "tape"), means for driving each reel support through a slipping clutch and means for applying a braking torque to each reel support. The machine also includes a driven capstan for imparting a drive to the tape in its run between the reels or other holders (all hereinafter included in the term "reels"). The capstan is associated with a flywheel for ensuring a constant speed of the tape within close limits. The flywheel generally forms part of the drive to the capstan. In a machine of this type the tape is usually driven by a capstan carried on or formed by the flywheel spindle and is held in contact therewith by a tape pressure roller. There are also one or more magnetic heads.

The present invention provides an improved mechanism for driving the tape at constant speed in either direction, as desired. This mechanism, which is actuated by a single reversible electric motor, comprises a pair of intermediate wheels adapted to be frictionally driven, directly or indirectly, by the motor spindle and mounted on a pivoted support capable of being moved from a first position, in which the first intermediate wheel friction drives the flywheel to advance the tape past the head or heads at constant speed in one direction and the second intermediate wheel friction drives the support holding the reel serving as the take-up reel, into a second position in which the second intermediate wheel friction drives the flywheel to advance the tape past the head or heads at constant speed in the reverse direction and the first intermediate wheel friction drives the other support holding the reel now serving as the take-up reel.

The friction drives to the two reel supports include slipping clutches preferably on the two reel supports, which clutches are each of lower torque-transmitting capacity than the friction drive to the capstan.

Preferably the pivoted support is capable of being moved into a third position in which the second intermediate wheel friction drives the support holding the reel serving as the take-up reel without the intervention of the slipping clutch, and is also capable of being moved into a fourth position in which the first intermediate wheel friction drives the other support holding the other reel now serving as the take-up reel without the intervention of the slipping clutch, thereby providing fast winding facilities in each direction.

The intermediate wheels for friction-driving the reel supports are preferably spring urged towards the motor spindle or to a wheel coaxially fixed to the motor spindle.

We prefer to make the two intermediate wheels of equal diameter and at least their rims of natural or synthetic rubber.

Preferably the slipping drive to the appropriate take-up reel during a transducing operation is provided by a first wheel which is driven by the intermediate wheel not driving the flywheel and which in turn drives, through a slipping connection, a second wheel coaxial with the first wheel and forming part of, or positively connected to, the appropriate reel support. For a fast winding operation in either direction, in mechanisms where such facilities are provided, the appropriate intermediate wheel is preferably moved in a direction parallel to the axes of the intermediate wheels to engage the second wheel so as to drive it directly instead of through the slipping connection.

Reversal of the direction of travel of the tape may be brought about by operation of a control member which effects reversal of the direction of rotation of the motor spindle and changes the setting of the intermediate wheel drive from one reel support to the other. Preferably the movable support for the two intermediate wheels is pivotally mounted on the base plate of the machine and supports, at a distance from the pivot, a pair of arms, each of which arms supports one of the intermediate wheels, the pivot axis being parallel to the axes of the intermediate wheels. In addition to springs provided for urging the intermediate wheels into driven engagement with the motor spindle, or with a wheel coaxially fixed to the motor spindle, we preferably also provide a second pair of springs, one spring for each intermediate wheel, to urge whichever intermediate wheel is appropriate into engagement with the flywheel or other wheel coupled to the capstan during a transducing operation. When one of this second pair of springs is operative the other is not.

Alternatively reversal may be effected automatically by reversal of the direction of rotation of the motor spindle. This may be done by employing a support for the intermediate wheels that is permitted to oscillate in a plane normal to the axes of the wheels and arranging for the motor spindle to apply a torque to the oscillatable support in a direction dependent upon the direction of rotation of the motor.

The control member which actuates the switch controlling the direction of running of the motor preferably has, between its two running positions, a third position. This third position is a neutral or "off" position in which the intermediate wheels are out of contact with the wheels which they would drive if the control member was in a running position. In the neutral or "off" position of the control member the motor is preferably de-energised and brakes are applied to the reel supports. These brakes may be of the band type or may be pads of friction material. During movement to a transducing position the control member may bring about, directly or indirectly, the application of pressure applying means to press the tape into engagement with one or more heads performing a transducing operation. Each pressure applying means is preferably a disc of felt. The control member may also bring the tape pressure roller into a position to hold the tape in contact with the capstan in order that the capstan may drive the tape. Where the apparatus is designed to record on (and/or reproduce from) the tape two or more tracks in succession, the control member may be used to bring about a lateral movement of the tape or the head or heads sufficing to change over from one track to the next or it may serve to render one magnetic circuit of a multicircuit head (or one of two or more heads) inoperative to record on (or reproduce from) an adjoining track.

Figure 2:
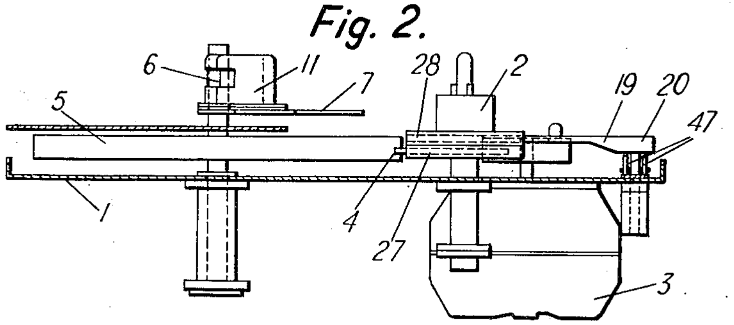
Figures 3, 4:
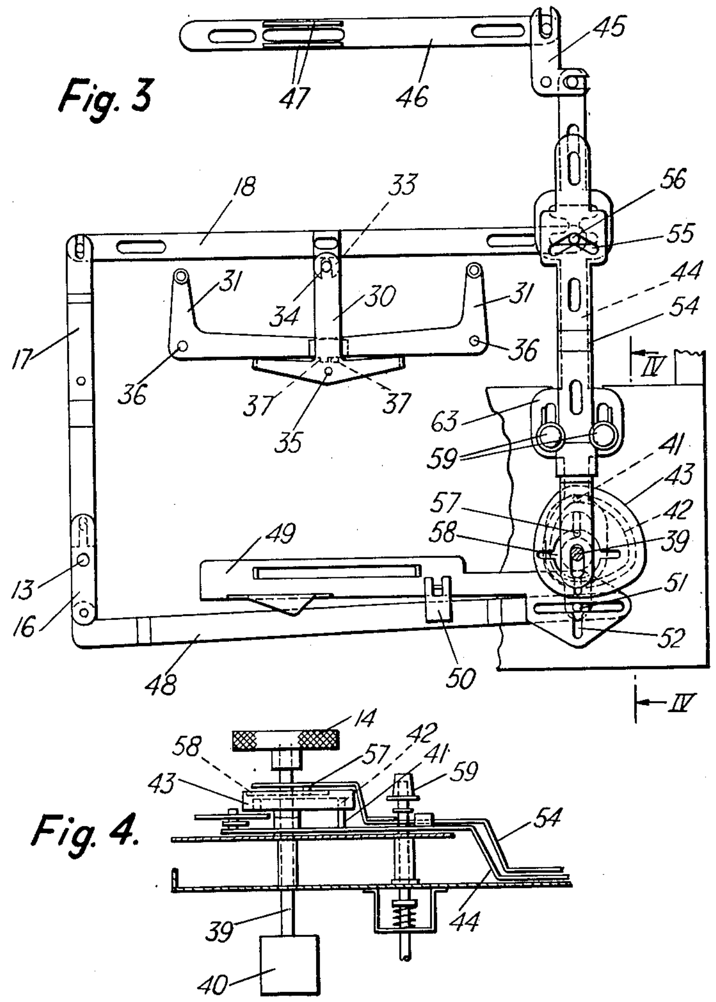
Figure 5:
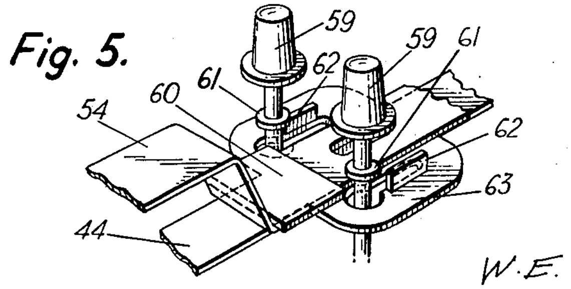
Figure 6:
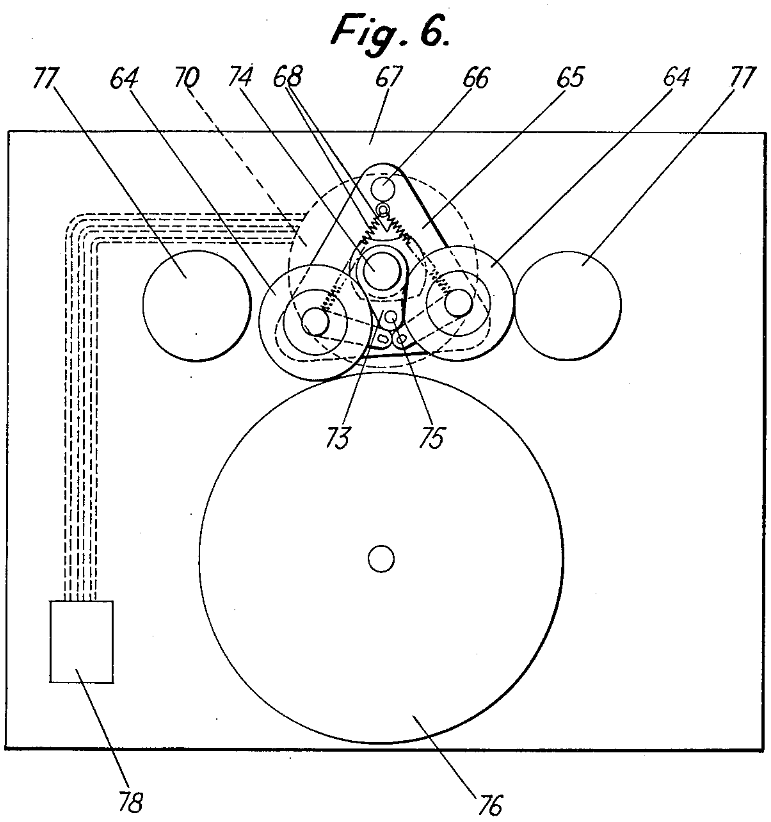
Figure 7:
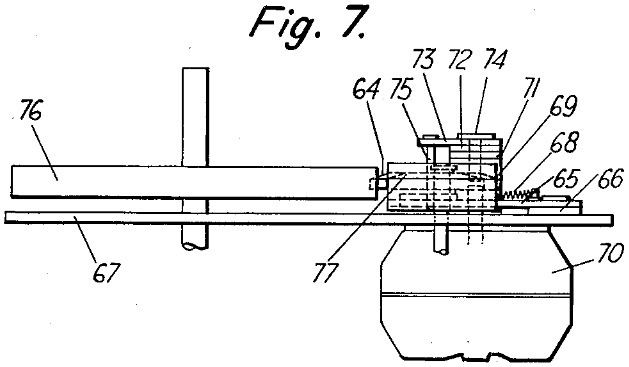

The invention will be further described by way of example with reference to the accompanying drawings in which:

FIGURE 1 is a plan view of one form of tape transport mechanism in accordance with the invention, FIGURE 2 is a sectional elevation taken along the line II—II of FIGURE 1, with some of the parts removed for clarity, FIGURE 3 is a plan view of the mechanical linkages used in the mechanism, FIGURE 4 is a sectional elevation of a control member of the mechanism, taken along the line IV—IV of FIGURE 3, FIGURE 5 is a perspective view of interlocking buttons and associated parts on the mechanism, FIGURE 6 is a plan view of a mechanism which may replace part of that shown in FIGURE 1 and FIGURE 7 is a side elevation of the mechanism shown in FIGURE 6.

The mechanism shown in FIGURES 1 and 2 comprises a rectangular base plate 1 which carries two supports 2 for receiving reels of tape in such a way that the supports are free to rotate. On the underside of the base plate is fixed a single reversible motor 3 which is adapted to drive the reel support holding the reel serving as the take-up reel through one of a pair of intermediate wheels 4. The reversible motor drives a flywheel 5 through the other intermediate wheel 4, the flywheel being on the upper side of the base plate. A capstan 6 formed by the shaft of the flywheel projects through an aperture in an upper plate 7. During recording and reproducing the tape is driven at a constant linear speed by means of the capstan 6 and a tape pressure roller 8 which is urged by a spring 9 to press the tape into driving engagement with the capstan. The machine is a twin track machine adapted to play the two tracks in succession and is provided with a record/playback head 10 and erase head 11 for each track, the heads being positioned on the upper plate 7.

A first control member is provided comprising a manually operated knob 12 fastened on one end of a shaft 13 which is rotatable between three positions. With the knob in a first position, the tape is driven or wound in one direction, with the knob in a second position, the tape is driven or wound in the reverse direction and with the knob in a third position, intermediate between the other two, the tape is stationary. In FIGURE 1, the knob is shown in the third position. The position of a second control member (to which reference will be made later), provided with a knob 14, determines the speed at which the tape is wound and whether or not it is wound past the heads at a constant transducing speed under the control of the capstan.

On movement of the first control knob 12 its shaft 13 operates a switch 15 to energise the reversible motor to wind the tape in the appropriate direction or to de-energise the motor, the speed of the motor being dependent on the second control knob 14. The switch 15 also brings into the circuit the appropriate head or heads in accordance with the direction of movement of the tape. The shaft 13 carries a lever 16 (which may best be seen by reference to FIGURE 3) coupled to a lever 17 which operates a slide 18 and brings about a movement of a pivoted support 19 (see FIGURES 1 and 2) for the two intermediate wheels 4. The support is a ring pivoted at an extension 20 on its periphery and supporting a pair of arms 21 mounted on a second extension 22 diametrically opposite the first extension. Each arm supports one of the intermediate wheels for free rotation, the intermediate wheels being of the same diameter and having rubber rims. A pivot 23 for these arms passes through a slot in the base plate and is movable by the slide 18. The pivot 23 passes through a slot 24 in each arm to permit a certain amount of lost motion of the arms when the pivot is moved by the slide. The axes of the intermediate wheels are parallel to the pivoted axis of the pivoted support 19 and the motor spindle axis. The intermediate wheels are driven by a wheel 25 mounted on the motor spindle and passing with a large radial clearance through the ring forming the support for the intermediate wheels. Springs 26 are provided for urging the intermediate wheels into driving contact with this wheel.

The knob 14 of the second control member is movable between four positions. In two of these positions the tape is wound past the heads under the control of the capstan at constant transducing speeds of, for example, 3¾ and 7½ inches per second respectively and in other positions the tape is wound without the control of the capstan at a fast or slow winding speed (hereinafter referred to as "fast wind" and "slow wind"). When the second control knob 14 is in a position to wind the tape past the heads at a constant transducing speed and the first control knob 12 is moved into one of its operative positions, the slide 18 moves the pivot 23 for the two arms of the pivoted support to a first position in which the first intermediate wheel friction drives the flywheel 5 to advance the tape past the heads at constant speed in one direction and the second intermediate wheel friction drives a wheel 27 mounted coaxially with, and having a slipping drive to, a wheel 28 forming part of the support for the reel serving as the take-up reel (see FIGURE 2). The slipping drive comprises a ring of felt on the upper side of the wheel 27 and in contact with the lower side of the wheel 28. When the first control knob 12 is moved into the other operative position (the second control knob 14 still being in a transducing position) the slide 18 moves the pivot 23 for the two arms of the pivoted support to a second position in which the second intermediate wheel friction drives the flywheel 5 to advance the tape past the heads at a constant speed in the reverse direction and the first intermediate wheel friction drives a wheel mounted coaxially with, and having a similar slipping drive to, a wheel forming part of the support for the reel now serving as the take-up reel. A spring 29 is provided for each intermediate wheel 14 and is fastened at one end to the pivot and at the other end to the spindle of the friction wheel 4 to urge which ever intermediate wheel is appropriate into engagement with the flywheel. When one of these springs is operative the other is relaxed.

As may be seen by reference to FIGURES 1 and 3, the slide 18 also actuates a linkage comprising a T member 30 and a pair of bell crank levers 31, one for each reel support, to apply brake bands 32 to the reel supports when the first control knob 12 is moved from an operative position to the "off" position and to take the brake bands off when the first control knob 12 is moved from the "off" position to an operative position. This is done as follows. The slide 18 has a rigid projection 33 which is provided with a recess into which fits a stud 34 on the end of the T member. The T member is mounted on a pivot 35 secured to the base plate. When the first control knob 12 is moved from its "off" position into one or other of the operative positions the slide 18 rotates the T member about its pivot to press one arm of the T member against the arm of the adjacent bell crank lever and to rotate that bell crank lever about its pivot 36. Each bell crank lever is provided with a projection 37, the projection on one of the bell crank levers being upwardly directed and the projection on the other bell crank lever being downwardly directed. When one of the bell crank levers is pressed by an arm of the T member it carries the other bell crank lever with it against the action of springs 38 and through interengagement of the two projections 37. This movement releases the two band brakes 32. When the first control knob 12 is returned to its "off" position the arm of the T member comes away from the arm of the bell crank lever and the springs 38 return both bell crank levers to positions in which the brake bands are applied to the reel supports. In the "off" position the pivoted support 19 is so located that the intermediate wheels 4 are not held against either the flywheel or the driving wheels (27 or 28) for the tape reels.

As may be seen by reference to FIGURE 4, the second control member comprises the manually operable knob 14 fastened on one end of a rotatable shaft 39. This shaft is provided with switches 40 which control circuits for the motor to provide the two playing speeds in a direction determined by the position of the first control knob 12.

As mentioned above, the second control knob 14 has two other positions for winding the tape, the direction again being determined by the position of the first control member. When the second control knob 14 is in either of these two positions the appropriate reel support 2 is driven directly from the motor through one of the intermediate wheels 4 without the intervention of the slipping drive. The linkage for obtaining this form of drive ("fast wind" and "slow wind") will hereinafter be described with reference to FIGURES 3 and 4.

A pin 41 engages in a cam groove 42 in the underside of a plate 43 attached to the shaft 39, the pin being fastened near one end of a slide 44. Movement of the knob 14 from a transducing position into the "fast wind" or "slow wind" position causes a longitudinal displacement of the slide 44 and thereby clockwise rotation of a bell crank lever 45. This movement of the bell crank lever 45 displaces a slide 46, having cam surfaces 47, into aposition in which these cam surfaces lift the pivoted support 19 for the intermediate wheels (see FIGURES 1 and 2) in such a way that the intermediate wheels are raised into a position in which they can no longer make contact with the slipping clutch drive 27 but can friction drive the wheel 28 formed on the take-up reel support, directly, when the knob 12 is moved into a forward or reverse position. The return movement of the knob 14 into a position for winding the tape past the heads at a constant transducing speed causes anti-clockwise movement of the bell crank lever 45 and thereby downward movement of the pivoted support 19 for the intermediate wheels into a position in which they are again in a position to friction drive the take-up reel support through the wheel 27 and the slipping clutch.

An interlocking lever 48 (see FIGURE 3) is pivotally attached at one end to the lever 16. This lever 48 engages with a slide 49 through a connecting link 50 when the second control member 14 is in a transducing position. When the knob 14 is moved into a "fast wind" or "slow wind" position the link 50 is disengaged through movement of a pin 51 which is fastened at the end of the slide 44 and protrudes through a slot in the end of the lever 48, the pin moving outwardly along the leg 52 of a T-slot in the slide 49. The slide 49 controls the movement of the tape pressure roller 8 (FIGURE 1) to urge it into contact with the tape and hold the tape against the capstan to drive the tape at a constant playing speed when the first control knob 12 is in the forward or reverse position and the second control knob 14 is in a transducing position. The slide member 49 holds the tape pressure roller away from the capstan in all other positions of the two control members. The slide member also controls the movement of tape pressure discs 53, suitably of felt, which urge the tape into contact with the appropriate one of the heads 10 when the first control knob 12 is in its forward or reverse position and the second control knob 14 is in a transducing position. The pressure discs are held away from the heads 10 in all other positions of the control members.

Further interlocking means comprises a slide 54 having a V-shaped slot 55 which engages a pin 56 carried on the slide 18. When the first control knob 12 is moved into its forward or reverse position the pin 56 moves the slide 54 into a position in which a pin 57 at its opposite end (see FIGURES 3 and 4) engages one of four radial extensions of a circular groove 58 in the plate 43 to lock the second control knob 14 until the first control knob 12 is returned to its "off" position.

Two push buttons 59 are provided, one associated with a microphone input and the other with some other input, for example a radio tuner or gramophone pick-up. When either of these buttons is depressed the recording circuit is made operative. In order to make a recording the second control knob 14 is positioned for the tape to be driven at the desired speed and the appropriate button is depressed whilst moving the first control knob 12 from the "off" position to its forward or reverse position. On completion of the movement of the first control member, the button is locked in the depressed position by a plate 60 attached to the slide 54 which plate engages with the top of a flange 61 on the button (see FIGURE 5). The button is self restoring when the first control knob 12 is returned to its "off" position. When the second control knob 14 is in a "fast wind" or "slow wind" position, the buttons are prevented from being depressed by projections 62 on the walls of key-hole slots in a plate 63 attached to the slide 44, the projections 62 being directly underneath the flanges 61 when the second control knob 14 is in the "fast wind" or "slow wind" position. With this interlock it is virtually impossible inadvertently to spoil a record already made on the tape.

FIGURES 6 and 7 show a mechanism which may be used to replace the track reversal mechanism of FIGURES 1 to 5, and in which reversal is effected automatically by the reversal of the direction of rotation of the motor spindle.

A pair of intermediate wheels 64 are supported for free rotation on a triangular oscillatable plate 65 mounted on a pivot 66 on the upper side of a base plate 67. The intermediate wheels are urged by springs 68 into contact with the driving wheel 69 carried on the spindle of a reversible electric motor 70. The wheel 69 also forms part of a friction clutch comprising a pair of circular washers of material having a suitable coefficient of friction, one washer 71 being bonded to the wheel 69 and the other washer 72 being bonded to one end of a positioning arm 73 which is captively mounted for rotation on the outer end of the motor spindle by a headed pin 74. The positioning arm 73 is coupled through a pin 75 to the oscillatable plate 65.

When the motor spindle rotates in one direction a torque is applied from it through the friction clutch on the motor spindle to the positioning arm and this torque urges the oscillatable plate into a first position where the first intermediate wheel friction drives the flywheel 76 and the second intermediate friction wheel drives, through a slipping clutch, the support 77 holding the reel serving as the take-up reel. When the motor spindle rotates in the reverse direction a reverse torque is applied through the friction clutch on the motor spindle to the positioning arm which moves the oscillatable plate into a second position in which the second intermediate wheel friction drives the flywheel 76 and the first intermediate wheel friction drives, through a slipping clutch, the other support 77 holding the reel now serving as the take-up reel.

In this way reversal of the direction of travel of the tape is effected without mechanical linkages by reversal of the direction of rotation of the motor spindle by operating a motor control switch 78.

What I claim as my invention is:

1. A reversibly operable winding mechanism for feeding an elongated magnetic record carrier, comprising a rotary driving member coupled to a single reversible motor, two rotary supports each adapted to support a holder for the magnetic record carrier wound into a spiral, a slipping clutch drive for each rotary support, first and second intermediate wheels each adapted to be frictionally driven from the driving member, a pivoted support on which said intermediate wheels are mounted, a driven capstan for imparting a drive to the magnetic record carrier in its run between the holders, the axis of the first intermediate wheel always lying within one of the two triangles formed by the axis of the driving member, the axis of the capstan and the axis of one rotary support, and the axis of the second intermediate wheel always lying within the other such triangle, and means for moving said pivoted support from a first position, in which the first intermediate wheel frictionally drives the capstan to advance the magnetic record carrier at constant speed in one direction and the second intermediate wheel frictionally drives, through the slipping clutch drive for the first rotary support, the first holder serving as the take-up holder, to a second position in which the second intermediate wheel frictionally drives the capstan in the opposite direction and the first intermediate wheel frictionally drives, through the slipping clutch drive for the second rotary support, the second holder now serving as the take-up holder.

2. A reversibly operable winding mechanism for feeding an elongated magnetic record carrier, comprising a rotary driving member coupled to a single reversible motor, two rotary supports each adapted to support a holder for the magnetic record carrier wound into a spiral, a slipping clutch drive for each rotary support, first and second intermediate wheels each adapted to be frictionally driven from the driving member, a pivoted support on which said intermediate wheels are mounted, a driven capstan for imparting a drive to the magnetic record carrier in its run between the holders, the axis of the first intermediate wheel always lying within one of the two triangles formed by the axis of the driving member, the axis of the capstan and the axis of one rotary support, and the axis of the second intermediate wheel always lying within the other such triangle, and means for moving said pivoted support from a neutral position into a first position in which the first intermediate wheel frictionally drives the capstan to advance the magnetic record carrier at constant speed in one direction and the second intermediate wheel frictionally drives, through the slipping clutch drive for the first rotary support, the first holder serving as the take-up holder, and into a second position in which the second intermediate wheel frictionally drives the capstan in the opposite direction and the first intermediate wheel frictionally drives, through the slipping clutch drive for the second rotary support, the second holder now serving as the take-up holder, the neutral position being one in which the intermediate wheels are out of contact with the members which they would drive if the pivoted support were in either of the other two positions.

3. A reversibly operable winding mechanism for feeding an elongated magnetic record carrier, comprising a rotary driving member coupled to a single reversible motor, two rotary supports each adapted to support a holder for the magnetic record carrier wound into a spiral, a slipping clutch drive for each rotary support, first and second intermediate wheels each adapted to be frictionally driven from the driving member, a pivoted support on which said intermediate wheels are mounted, a driven capstan for imparting a drive to the magnetic record carrier in its run between the holders, the axis of the first intermediate wheel always lying within one of the two triangles formed by the axis of the motor spindle, the axis of the capstan and the axis of one rotary support, and the axis of the second intermediate wheel always lying within the other such triangle, and means for moving said pivoted support betwen at least four positions in which in the first position the first intermediate wheel frictionally drives the capstan to advance the magnetic record carrier at constant speed in one direction and the second intermediate wheel fricitonally drives, through the slipping clutch drive for the first rotary support, the first holder serving as the take-up holder, in the second position the second intermediate wheel frictionally drives the capstan to advance the magnetic record carrier at constant speed in the opposite direction and the first intermediate wheel frictionally drives, through the slipping clutch drive for the second rotary support, the second holder now serving as the take-up holder, in the third position the second intermediate wheel frictionally drives, without the intervention of the slipping clutch drive, the first rotary support for the first holder which then serves as the take-up holder, and in the fourth position, the first intermediate wheel frictionally drives, without the intervention of the slipping clutch drive, the second rotary support for the second holder which then serves as the take-up holder.

4. A reversibly operable winding mechanism for feeding an elongated magnetic record carrier, comprising a rotary driving member coupled to a single reversible motor, two rotary supports each adapted to support a holder for the magnetic record carrier wound into a spiral, a slipping clutch drive for each rotary support, first and second intermediate wheels each adapted to be frictionally driven from the driving member, a pair of arms each of which supports one of said intermediate wheels, a pivot, a pivoted support mounted on the pivot and on which the arms are carried at a distance from the pivot, a driven capstan for imparting a drive to the magnetic record carrier in its run between the holders, the axis of the first intermediate wheel always lying within one of the two triangles formed by the axis of the motor spindle, the axis of the capstan and the axis of one rotary support, and the axis of the second intermediate wheel always lying within the other such triangle, and means for moving said pivoted support from a first position in which the first intermediate wheel frictionally drives the capstan to advance the magnetic record carrier at constant sped in one direction and the second intermediate wheel frictionally drives, through the slipping clutch drive for the first rotary support, the first holder serving as the take-up holder, to a second position in which the second intermediate wheel frictionally drives the capstan in the opposite direction and the first intermediate wheel frictionally drives, through the slipping clutch drive for the second rotary support, the second holder now serving as the take-up holder, springs connected between the pivoted support and the intermediate wheels which allow said wheels to move with respect to the pivoted support and which, in each position urge the appropriate intermediate wheel into a position in which it is driven by the driving member and drives the appropriate rotary support.

5. A reversibly operable winding mechanism for feeding an elongated magnetic record carrier, comprising a rotary driving member coupled to a single reversible motor, two rotary supports each adapted to support a holder for the magnetic record carrier wound into a spiral, a slipping clutch drive for each rotary support, first and second intermediate wheels each adapted to be frictionally driven from the driving member, a pivoted support on which said intermediate wheels are mounted, the pivoted support being capable of oscillating in a plane normal to the axes of the intermediate wheels, a driven capstan for imparting a drive to the magnetic record carrier in its run between the holders, the axis of the first intermediate wheel always lying within one of the two triangles formed by the axis of the motor spindle, the axis of the capstan and the axis of one rotary support, and the axis of the second intermediate wheel always lying within the other such triangle, and friction means associated with the driving member applying a torque to said pivoted support to move the pivoted support, when the driving member rotates in one direction, into a first position in which the first intermediate wheel frictionally drives the capstan to advance the magnetic record carrier at constant speed in one direction and the second intermediate wheel frictionally drives, through the slipping clutch drive for the first rotary support, the first holder serving as the take-up holder and, when the driving member rotates in the opposite direction, applying a torque to the pivoted support to move the pivoted support into a second position in which the second intermediate wheel frictionally drives the capstan in the opposite direction and the first intermediate wheel frictionally drives, through the slipping clutch drive for the second rotary support, the second holder now serving as the take-up holder.

6. A reversibly operable winding mechanism for feeding an elongated magnetic record carrier, comprising a rotary driving member coupled to a single reversible motor, two rotary supports each adapted to support a holder for the magnetic record carrier wound into a spiral, a slipping clutch drive for each rotary support, first and second intermediate wheels each adapted to be frictionally driven from the driving member, a pivoted support on which said intermediate wheels are mounted, a positioning arm mounted on the motor spindle, a friction clutch on the driving member, the positioning arm being coupled to the driving member through the friction clutch on the driving member and to the pivoted support, a driven capstan for imparting a drive to the magnetic record carrier in its run between the holders, the axis of the first intermediate wheel always lying within one of the two triangles formed by the axis of the driving member, the axis of the capstan and the axis of one rotary support, and the axis of the second intermediate wheel always lying within the other such triangle, and means whereby the driving member when it rotates in one direction applies a torque through the positioning arm to move said pivoted support into a first position in which the first intermediate wheel frictionally drives the capstan to advance the magnetic record carrier at constant speed in one direction and the second intermediate wheel frictionally drives, through the slipping clutch drive for the first rotary support, the first holder serving as the take-up holder and, when the driving member rotates in the reverse direction, applies a torque through the positioning arm to move the pivoted support into a second position in which the second intermediate wheel frictionally drives the capstan to advance the magnetic record carrier at constant speed in the opposite direction and the second intermediate wheel frictionally drives, through the slipping clutch drives for the second rotary support, the second holder now serving as the take-up holder.

7. A mechanism in accordance with claim 4 wherein a pin is carried by said pivoted support, said arms on which said intermediate wheels are mounted are slotted, said slots engaging said pin and springs are coupled between said pin and said intermediate wheels in such a way that, under the action of said springs, said intermediate wheels adopt the appropriate positions for driving said capstan in said first and second positions.

8. A mechanism in accordance with claim 3, wherein each slipping clutch drive comprises first and second coaxially mounted wheels and a slipping connection between them, said first wheel being adapted to be driven directly by one of said intermediate wheels in one of said first and said second positions and said second wheel being adapted to drive a holder directly and to be driven directly by the same one of said intermediate wheels in one of said third and fourth positions.

9. A mechanism in accordance with claim 3 having a neutral position between the first and second positions and also between the third and fourth positions and wherein each slipping clutch drive comprises first and second coaxially mounted wheels and a slipping connection between them, said first wheel being adapted to be driven directly by one of said intermediate wheels in one of said first and second positions, said second wheel being adapted to drive a holder directly and to be driven directly by the same one of said intermediate wheels in one of said third and fourth positions, and means for axially moving said intermediate wheels which is interlocked with means for moving said pivoted support from and to said neutral positions to prevent said intermediate wheels from being moved to engage said second wheel unless said pivoted support is in a neutral position.

10. In a mechanism in accordance with claim 1, a control member which effects reversal of the direction of travel of the magnetic record carrier by simultaneously effecting reversal of the direction of rotation of the driving member and changing the setting of the intermediate wheel drive from one rotary support to the other.

11. In a mechanism in accordance with claim 2 for a machine having recording and reproducing circuits, a manually operated switch for rendering said recording circuit operative and means interlocking said switch with said pivoted support which prevent it from being moved into the recording position unless said pivoted support is in the neutral position and means for locking said switch in the operative position if said pivoted support is moved into one of said first and second positions while said switch is operated.

References Cited in the file of this patent

UNITED STATES PATENTS

| | | |
|---|---|---|
| 2,430,538 | Somers | Nov. 11, 1947 |
| 2,535,498 | Kornei | Dec. 26, 1950 |
| 2,620,404 | Pond | Dec. 2, 1952 |
| 2,668,059 | Roberts | Feb. 2, 1954 |
| 2,790,643 | Gedde | Apr. 30, 1957 |
| 2,920,148 | Munroe | Jan. 5, 1960 |